United States Patent [19]
Koselke et al.

[11] Patent Number: 6,084,366
[45] Date of Patent: Jul. 4, 2000

[54] DC POWERED HAND TOOLS WITH AUTOMATIC BRAKING SYSTEM

[75] Inventors: Andrew Koselke, Etna Green, Ind.; Stuart Koford, Naperville, Ill.

[73] Assignee: Nuell, Inc., Warsaw, Ind.

[21] Appl. No.: 09/137,333

[22] Filed: Aug. 20, 1998

[51] Int. Cl.[7] .................................................. H02P 3/18
[52] U.S. Cl. ........................ 318/375; 318/362; 318/378; 388/937
[58] Field of Search ................................. 318/369–380, 318/540–549; 388/937

[56] References Cited

U.S. PATENT DOCUMENTS

| | | | |
|---|---|---|---|
| 3,854,080 | 12/1974 | Bambara et al. | 318/549 |
| 4,097,704 | 6/1978 | Piber | 200/157 |
| 4,267,914 | 5/1981 | Saar | 192/147 |
| 4,839,533 | 6/1989 | Aga | 307/140 |
| 5,014,793 | 5/1991 | Germanton et al. | 173/12 |
| 5,136,220 | 8/1992 | Philipp | 318/362 |
| 5,235,261 | 8/1993 | Philipp | 318/504 |
| 5,268,622 | 12/1993 | Philipp | 318/254 |
| 5,831,404 | 11/1998 | Ishii | 318/434 |

*Primary Examiner*—Paul Ip
*Attorney, Agent, or Firm*—Lundy and Associates

[57] ABSTRACT

A hand held battery powered tool having a motor with a rotor within a stator having stator windings and a motor control trigger operably movable between off and enable positions with means for sensing the trigger position and proving an output signal indicating trigger movement to the off position and means responsive to the output signal for shorting the motor windings and dissipating the kinetic energy of the rotating rotor as heat. A method of retarding rotation of the rotor of the motor comprising the steps of sensation of motor operation command and shorting the motor windings upon sensing the motor operation command while continuing electronic commutation of the motor windings is also provided.

21 Claims, 2 Drawing Sheets

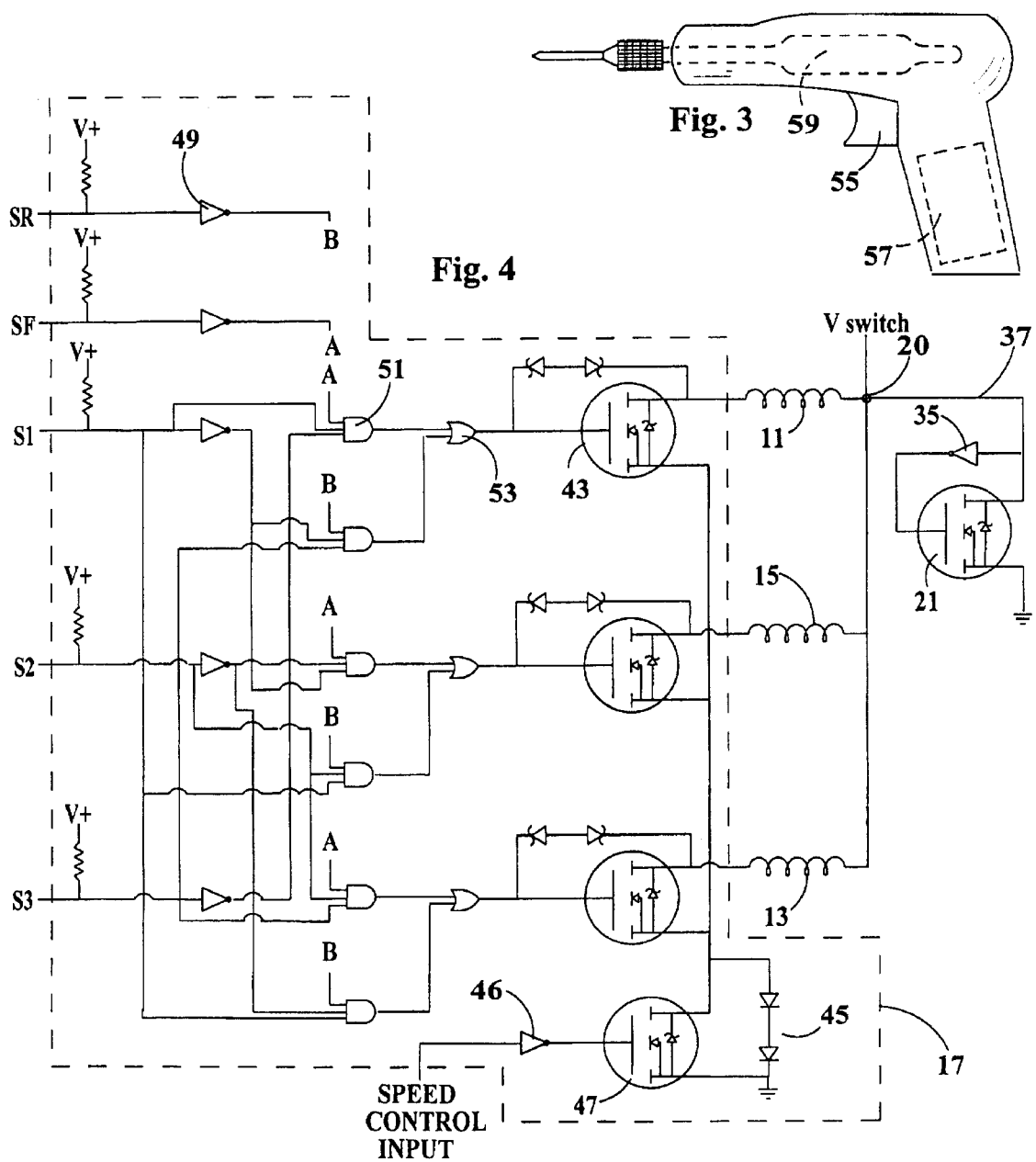

DC POWERED HAND TOOLS WITH AUTOMATIC BRAKING SYSTEM

BACKGROUND OF THE INVENTION

The present invention relates generally to DC powered hand held tools and electronic controls for direct current motors and more particularly to a new and improved dynamic braking circuit for electronically commutated (brushless) direct current hand held tools.

Electronic commutation in direct current (DC) motors is well documented. Such electronic commutation eliminates the brushes and commutators long associated with DC motors along with the associated friction, brush wear, generation of contamination particles and arcing. In surgical tools, these commutators and associated brushes and hardware are adversely affected by steam autoclaving (sterilization) often used with such tools.

Hand held rechargeable battery powered tools are also commonplace including electric drills, screwdrivers, grass trimmers and the like. Most of these tools rely on friction produced largely by the brushes to slow and stop the bit or blades when a control trigger is released.

In U.S. Pat. No. 5,235,261 there is disclosed a DC powered surgical handpiece which includes a circuit for braking the motor to a halt when the operator releases a control trigger. Braking in this patented arrangement is achieved by energizing all three winding switches (transistors) when a zero speed command is sensed. Since this patented arrangement requires a half wave design, this also shorts the battery to ground through the winding wasting battery power, and creating additional stress on the switches (transistors).

With such an arrangement, considerable battery power is consumed reducing the operating time available to a surgeon, and reducing battery life. Moreover, with the patented arrangement initial braking is delayed until the speed command signal has dropped to zero, and due to winding inductance created by the pulsing of the brake circuit, the retarding circuit reduces the braking effect at high speeds over what would otherwise be available. Braking with the patented circuit is available least, when needed most. Also due to the pulsing of the brake signal, reverse rotation can occur as the motor comes to a halt. The patented structure is highly complex with many components such as a step up switching power supply and other components likely to compromise reliability when subject to steam autoclaving.

It is therefore highly desirable to provide a new and improved DC powered hand held tool.

It is also highly desirable to provide a new and improved DC powered surgical handpiece.

It is also highly desirable to provide a new and improved braking circuit and method for such hand tools which will not consume battery power.

It is also highly desirable to provide a new and improved braking circuit and method which has a reduced number of components to increase reliability and reduce cost.

It is also highly desirable to provide a new and improved braking circuit and method which does not require the command speed to be reduced to zero before braking can occur.

It is also highly desirable to provide a new and improved braking circuit and method which does not cause reverse rotation as it comes to a halt.

It is also highly desirable to provide a new and improved braking circuit and method which controls the rate of braking without resorting to pulsing the braking current which can cause undesirable vibration, delayed braking and reverse rotation.

It is also highly desirable to provide a new and improved braking circuit and method which allows the use of full wave as well as half wave commutation.

It is also highly desirable to provide a new and improved method of retarding rotation of the rotor of a electronically commutated direct current motor by sensing the operator commanded motor rotation and shorting the motor output upon the cessation of commanded rotation while continuing electronic commutation of the motor windings, and dissipating as heat in the motor windings the kinetic energy of the motor rotation.

Finally, it is highly desirable to provide a new and improved hand held tool having all of the above features.

SUMMARY OF THE INVENTION

It is therefore an object of the invention to provide a new and improved DC powered hand held tool. It is also an object of the invention to provide a new and improved DC powered surgical handpiece.

It is also an object of the invention to provide a new and improved braking circuit and method for such hand tools which will not consume battery power.

It is also an object of the invention to provide a new and improved braking circuit and method which has a reduced number of components to increase reliability and reduce cost.

It is also an object of the invention to provide a new and improved braking circuit and method which does not require the command speed to be reduced to zero before braking can occur.

It is also an object of the invention to provide a new and improved braking circuit and method which does not cause reverse rotation as it comes to a halt.

It is also an object of the invention to provide a new and improved braking circuit and method which controls the rate of braking with out resorting to pulsing the braking current which can cause undesirable vibration, delayed braking and reverse rotation.

It is also an object of the invention to provide a new and improved braking circuit and method which allows the use of full wave as well as half wave commutation.

It is also an object of the invention to provide a new and improved method of retarding rotation of the rotor of a electronically commutated direct current motor by sensing the operator commanded motor rotation and shorting the motor output upon the cessation of commanded rotation while continuing electronic commutation of the motor windings, and dissipating as heat in the motor windings the kinetic energy of the motor rotation.

It is finally an object of the invention to provide a new and improved hand held tool having all of the above features.

In the broader aspects of the invention there is provided a hand held battery powered tool having a motor with a rotor within a stator having stator windings and a motor control trigger operably movable between off and enable positions with means for sensing the trigger position and proving an output signal indicating trigger movement to the off position and means responsive to the output signal for shorting the motor windings and dissipating the kinetic energy of the rotating rotor as heat. A method of retarding rotation of the rotor of the motor comprising the steps of sensation of motor operation command and shorting the motor windings upon sensing the motor operation command while continuing electronic commutation of the motor windings is also provided.

BRIEF DESCRIPTION OF THE DRAWINGS

FIG. 3 is a side elevation view of a hand held battery powered tool incorporating the braking circuit of the present invention; and FIG. 4 is a detailed schematic diagram of the circuit of FIG. 2.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF A SPECIFIC EMBODIMENT

Figure 1:
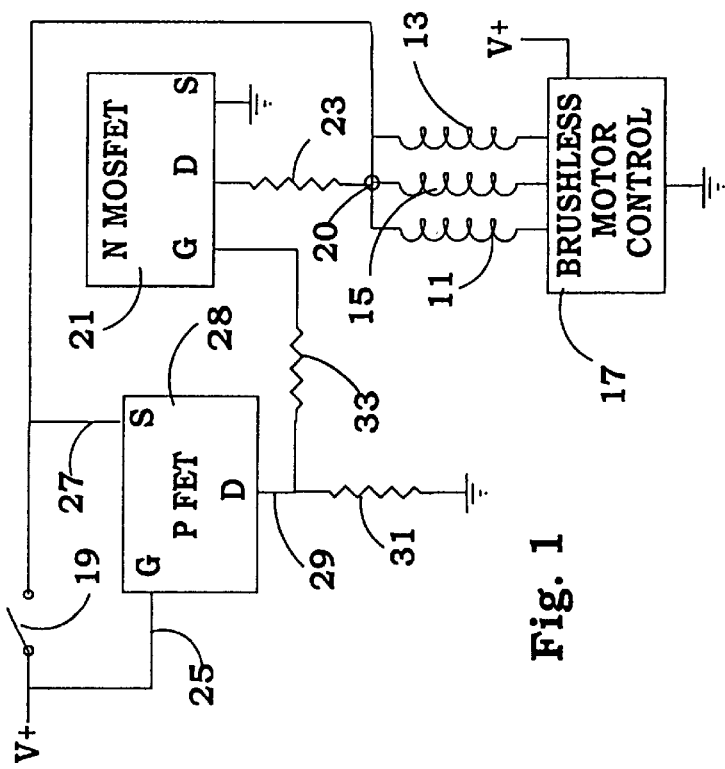
FIG. 1 is a schematic block diagram of a motor, control circuit and braking circuit according to the invention in one form.

In FIG. 1, a the windings 11, 13 and 15 of an electronically commutated motor are connected in series with a brushless motor controller 17 between the voltage supply V+ and ground when the switch 19 is closed thereby energizing the motor windings causing the armature 59 (FIG. 3) to rotate. The supply voltage V+ is from a rechargeable battery 57 located, for example, in the handle of the tool as shown in FIG. 3. Switch 19 is preferably closed by operator depression of a spring biased trigger 55 (FIG. 3). So long as the switch 19 remains closed, there is no potential difference between lines 25 and 27, and the field effect transistor (FET) 28 remains non-conducting. When the operator releases the trigger 55, the switch 19 opens increasing the gate (G) voltage on line 2 5 and enabling source (S) to drain (D) conduction through the FET 28. The conduction is from V+ via lines 25 and 29, resistor 33 and the metal oxide semiconductor field effect transistor (MOSFET) 21 to ground.

In a specific embodiment, MOSFET 21 connects node 20 to ground by way of an optional heat dissipating resistor 23. The purpose of this resistor is to fine tune the rate of braking by reducing the braking current. Because only one winding is connected at a time rather than all three at once, braking torque is normally not excessive and for most applications this resistor is not required. The brushless motor control 17 continues operation providing sequential conductive paths for the windings 11, 13 and 15 effectively shorting these winding through the resistor 23. Resistor 31 provides a pull down function to discharge the gate capacitance of the MOSFET 21.

Figure 2:
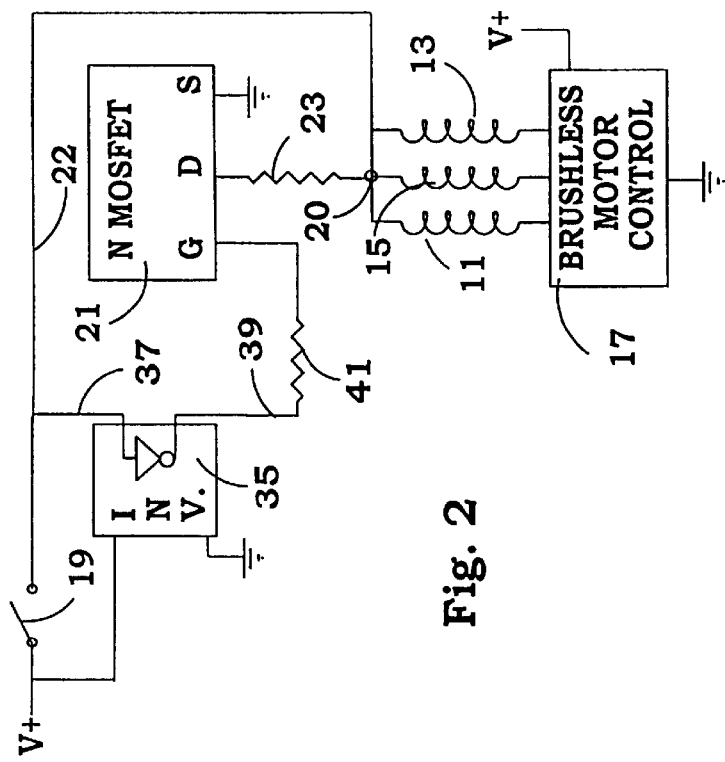
FIG. 2 is a schematic block diagram similar to FIG. 1, but illustrating a variation on the present invention.

The circuit of FIG. 2 differs from that of FIG. 1 in that the FET 28 has been replaced with an invertor 35 for sensing trigger 55 position and the condition of switch 19. So long as the potential on lines 22 and 37 is high, the potential on line 39 is low and the MOSFET 21 remains nonconducting. When the switch 19 is opened, the potential on line 22 goes low and the potential on line 39 goes high. The high potential on line 39 is supplied by way of resistor 41 to the gate G of MOSFET 21 enabling the conductive path between the source and drain again providing the effective shorting of the windings 11, 13 and 15 by resistor 23.

In a specific embodiment a silicon controlled rectifier or other gate controlled switching device may be substituted for the MOSFET 21. A silicon controlled rectifier has the drawback that it will continue to conduct despite removal of a gate signal, hence, the motor will be braked to a halt despite the operator's attempt to re-energize. Higher resistance values for resistor 23 moderate the braking effect and reduce strain of MOSFET 21. As above mentioned, resistor 23 may be omitted and the winding resistance relied upon for heat dissipation in some applications as illustrated in FIG. 4.

FIG. 4 shows the circuit of FIG. 2 in greater detail The brushless motor control is enclosed in dotted lines 17. The several sensor inputs along the left hand edge are from hall effect sensors and indicate the direction of rotation (SR and SF) as well as the angular position of the armature 59 (S1, S2 and S3). These sensor indications are transmitted by way of invertors 49 to be decoded by the logic gates 51 and 53. During forward rotation, the A terminals of each of three AND gates 51 are high or enabled and their signals are transmitted by way of OR gates 52 to properly sequentially render the MOSFET's 43 conductive thereby sequentially energizing the windings 11, 13 and 15. In practice, conduction in a winding such as 15 may begin before conduction in winding 11 ceases, conduction through winding 13 may commence prior to extinguishing the current flow in winding 15, etc. The term "sequentially" is intended to include such overlapping operation. During reverse rotation, the B terminals of the other three AND gates 51 are high, their signals are transmitted by the OR gates 53 and the order of sequential enabling of the MOSFET's 43 and the corresponding current flows in the windings are reversed. When both A and B are off, there is no signal to the MOSFET power switches 43 and the motor is off. Also, when the motor is at rest, V switch is off (zero potential on line 22 or node 20) and there is no voltage to the windings 11, 13 and 15. When the trigger 55 is depressed part way, power flows through switch 19, selected windings and the diodes 45 providing part speed and reduced jerk at start up. When trigger 55 is depressed further, the threshold of invertor 46 is exceeded and the power switch 47 is turned on giving full power to the windings.

In summary, the invention has a number of advantages over known prior art paramount among which are reduced cost, improved energy efficiency and enhanced stopping performance.

From the foregoing, it is now apparent that a novel brushless DC motor braking arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A hand held battery powered tool of the type having a motor with a rotor rotatable within a stator an stator windings, and a motor control trigger operator movable between off and enable positions, the improvement comprising:

means for sensing the trigger position and providing an output signal indicating trigger movement to the off position;

means responsive to said output signal for sequentially shorting the motor windings and dissipating the kinetic energy of the rotating motor armature as heat.

2. The improvement of claim 1 further comprising a heat dissipating resistor wherein the responsive means connects the motor windings and the heat dissipating resistor in series.

3. The improvement of claim 2 wherein the motor is an electronically commutated DC motor having brushless motor control circuitry responsive to rotor position to appropriately enable stator windings wherein the responsive means connects the motor windings, the heat dissipating resistor and the motor control circuitry in series.

4. The improvement of claim 1 further comprising a switch closed by depression of the trigger and opened when the trigger is released, the means for sensing comprising means monitoring the voltage across the switch and responsive to that monitored voltage to provide said output signal.

5. The improvement of claim 1 wherein the responsive means comprises a semiconductor switch.

6. The improvement of claim 1 wherein the means for sensing comprises a semiconductor switch.

7. The improvement of claim 1 wherein the means for sensing comprises an invertor which, upon removal of applied voltage accompanying opening of the switch, generates a voltage signal.

8. The method of retarding rotation of the armature of an electronically commutated direct current motor of the type having a plurality of motor stator windings and an operator actuable control for commanding motor operation comprising the steps of:

sensing cessation of a motor operation command; and sequentially shorting the motor windings upon cessation of the motor operation command while continuing electronic commutation of the motor windings.

9. The method of claim 8 wherein the step of sequentially shorting includes connecting the motor windings, electronic commutating circuitry and a heat dissipating resistance in series.

10. A hand held tool comprising a rechargeable battery, an electric motor including a set of brushless motor windings, a sequencing control for appropriately sequentially energizing the motor windings, an operator actuable control for selectively energizing the electric motor, a sensor for determining the condition of the operator actuable control, and normally open switch means connected in series with the motor windings and the sequencing control and responsive to a sensor indication that the operator actuable control is indicating de-energization of the motor to complete said series circuit and disconnecting the motor from the battery thereby sequentially shorting the motor windings.

11. The tool of claim 10 wherein the operator actuable control comprises a trigger actuated single-pole single-throw switch and the sensor comprises a transistor having control terminals spanning the switch poles and operable in response to a voltage across the switch poles to provide an output signal to close the normally open switch means.

12. The tool of claim 11 wherein the normally open switch means comprises a semiconductor switch.

13. The tool of claim 10 wherein the operator actuable control comprises a trigger actuated single-pole single-throw switch and the sensor comprises an invertor for providing an output signal to close the normally open switch means only when the single-pole single throw switch is opened to interrupt the supply of power to the windings.

14. The tool of claim 13 wherein the normally open switch means comprises a semiconductor switch.

15. The tool of claim 10 further comprising a means responsive to said sensor indication for dissipating the kinetic energy of the rotating armature as heat.

16. The tool of claim 15 further comprising a heat dissipating resistor wherein the normally opened switch means connects the motor windings and the heat dissipating resistor in series.

17. The tool of claim 16 wherein the motor is an electronically commutated DC motor having brushless motor control circuitry responsive to armature position to appropriately enable stator windings, and wherein said normally open switch when closed connects the motor windings, the heat dissipating resistor and the motor control circuitry in series.

18. The tool of claim 15 wherein said sensor and normally open switch means is closed by depression of the trigger and opened when the trigger is released, and said sensor includes means for monitoring the voltage across the switch and responsive to that monitored voltage to provide said sensor indication.

19. The tool of claim 15 wherein the responsive means comprises a semiconductor switch.

20. The tool of claim 15 wherein said sensor is a semiconductor switch.

21. The tool of claim 15 wherein said sensor comprises an invertor which upon the removal of applied voltage accompanying the opening of said switch generates a voltage signal.

* * * * *